(12) United States Patent
Johnson

(10) Patent No.: US 12,113,230 B2
(45) Date of Patent: Oct. 8, 2024

(54) CELL CONNECTOR SYSTEM FOR A SINGLE CELL

(71) Applicant: Hans Martin Tekeser, Grafenau (DE)

(72) Inventor: Torsten Johnson, Burg (DE)

(73) Assignee: DHST Holdings GmbH & Co. KG, Grafenau (DE)

( * ) Notice: Subject to any disclaimer, the term of this patent is extended or adjusted under 35 U.S.C. 154(b) by 625 days.

(21) Appl. No.: 17/348,132

(22) Filed: Jun. 15, 2021

(65) Prior Publication Data

US 2022/0006153 A1 Jan. 6, 2022

(30) Foreign Application Priority Data

Jul. 3, 2020 (DE) ..................... 10 2020 117 664.3

(51) Int. Cl.
| | |
|---|---|
| H01M 50/264 | (2021.01) |
| H01M 50/258 | (2021.01) |
| H01M 50/291 | (2021.01) |
| H01M 50/502 | (2021.01) |
| H01M 50/545 | (2021.01) |
| H01M 50/553 | (2021.01) |

(52) U.S. Cl.
CPC ....... *H01M 50/264* (2021.01); *H01M 50/258* (2021.01); *H01M 50/291* (2021.01); *H01M 50/502* (2021.01); *H01M 50/545* (2021.01); *H01M 50/553* (2021.01)

(58) Field of Classification Search
CPC ............. H01M 50/264; H01M 50/502; H01M 50/545; H01M 50/258; H01M 50/291; H01M 50/553
See application file for complete search history.

(56) References Cited

U.S. PATENT DOCUMENTS 9,385,360 B2 7/2016 Stoughton et al.

FOREIGN PATENT DOCUMENTS

| DE | 102009013727 | 9/2010 |
|---|---|---|
| DE | 102011109194 | 2/2012 |
| DE | 102011103991 | 12/2012 |
| DE | 102012018037 | 3/2014 |
| DE | 102012018088 | 3/2014 |

OTHER PUBLICATIONS

German Office Action issued Apr. 28, 2021 in German Patent Application No. 10 2002 117 664.3, 9 pages, with English partial translation, 8 pages.

*Primary Examiner* — Jane J Rhee
(74) *Attorney, Agent, or Firm* — WRB-IP PLLC

(57) ABSTRACT

A cell connector system is for connecting with at least one conductor tab of at least one single cell that is insertable into an electrical storage module having at least one frame device. The cell connector system includes a base contact profile with at least two end surfaces, a support surface, a transition surface, two opposing contact surfaces, and at least one lamella contact. The support surface can be placed on at least one frame device. At least one contact surface has a receiving recess with at least two retaining protrusions that receive the lamella contact. The lamella contact can establish a separable electrical connection to the conductor tab of the electrical single cell.

19 Claims, 11 Drawing Sheets

CELL CONNECTOR SYSTEM FOR A SINGLE CELL

FIELD OF THE INVENTION

The present invention relates to a cell connector system for at least one single cell with at least one conductor tab, whereby the single cell is insertable into an electrical storage module, which exhibits at least one frame device, comprising a base contact profile with at least two fronts, a support surface, a transition surface and two opposing contact surfaces, as well as at least one lamella contact.

The present invention further relates to an electrical storage module for at least one single cell, whereby the electrical storage module comprises at least two single cells interconnected in parallel or in series, each comprising at least one conductor tab and each arranged in a frame device.

BACKGROUND INFORMATION

Storage modules for electrical energy are known in the prior art. Essentially, such storage modules with multiple single cells are designed flat and angular, whereby their electrochemically effective contents of the single cells is surrounded by a foil-like housing, through which electrical connections in sheet metal form are routed as so-called conductor tabs. A single cell of an electrical storage module constructed in this way is generally referred to as a pouch or coffee bag cell.

To form an electrical storage module, in particular a high-voltage battery, multiple single cells are electrically interconnected in series and/or in parallel and arranged with a temperature control unit and electronic components in a battery housing consisting of frame devices. An electrical series connection of the single cells takes place directly by means of a connection of curved conductor tabs or by means of cell connectors, which are usually configured to connect the conductor tabs of adjacent single cells to one another.

In the prior art connections of conductor tabs of pouch cells are inextricably established by means of ultrasonic welding processes or laser welding processes. Alternatively, a detachable connection using screw clamp connectors is also used.

The generally sensitive and less dimensionally stable single cells for forming the electrical storage module or cell block are mechanically fixed in place by the frame devices, which are either arranged between the single cells or, in the case of a half-frame design, enclose them.

The single cells received in the frame devices are then pressed against one another by means of suitable clamping tools, such as tension rods, threaded rods or tension bands, which run in the edge areas of the frame devices of the single cells. The tension forces are brought into the cell block or into the electrical storage module by means of so-called pressure goggles located at the ends of the same.

Cell connectors used in the prior art for the electrical connection of the conductor tabs of the single cells are mechanically fixed in place to the frame devices by means of a clamping system or force-fitted by screwing or plastic riveting.

From the document DE 10 2012 018 037 A1 a battery from a stack of battery single cells is known, which are inserted between cell frames, whereby each battery single cell exhibits an electrode stack, which is pouch foil wrapped. The cell frames with the battery single cells are incorporated in a lamella stand between lamellas running transversely to the stacking direction. Electrical contact elements are designed integrated in the cell frame. The electrical contact elements are designed to be elastic on one side in the cell frame and are configured as locking elements for locking with the lamella stands. On one side, the contact elements are configured to be elastic, for example in two parts with a spring element arranged between them.

SUMMARY OF THE INVENTION

An object of the present invention is to provide a more stable cell connector system, which is configured to carry very high currents, in particular high-voltage currents, as well as to improve the temperature control of a single cell and an electrical storage module.

This object can be achieved by a cell connector system and by an electrical storage module with the features according to embodiments of the invention as set forth herein.

One subject of the present invention is a cell connector system for at least one single cell with at least one conductor tab, whereby the single cell is insertable into an electrical storage module, which cell connector system exhibits at least one frame device, comprising a base contact profile with at least two fronts i.e. end surfaces, a support surface, a transition surface and two mutually opposed contact surfaces, as well as at least one lamella contact. Typically, a respective single cell is arranged in a frame device, which can be assembled together to form an electrical storage module.

According to the invention the base contact profile is placeable with the support surface onto one of the at least one frame device, whereby at least one of the contact surfaces is designed as a mounting system with a receiving recess with at least two retaining protrusions, whereby the receiving recess is configured to completely incorporate the at least one lamella contact, whereby the cell connector system is configured to establish a separable electrical connection by means of the at least one lamella contact to the at least one conductor tab of the electrical single cell. The cell connector system is thus designed in several parts. Typically, the base contact profile can be welded to the frame device with the aid of dowels, in particular plastic dowels.

The cell connector system is configured to facilitate and improve contacting of at least two adjacent single cells of the electrical storage module in each case by means of the conductor tabs of the respective single cells.

Ordinarily, each of the contact surfaces of the base contact profile exhibits a mounting system with a receiving recess and with at least two retaining protrusions, which are configured to receive and retain a lamella contact in the respective receiving recess. The cell connector system can thus be configured to electrically contact an adjacent frame device on both sides respectively.

Due to the separable design of the electrical connection or contacting of the at least one single cell by the cell connector system, the at least one single cell is exchangeable if necessary. An electrical storage module comprising at least one single cell with the cell connector system according to the invention can thus be rehashed and is therefore more sustainable, since the single cells are exchangeable, and the entire electrical storage module does not have to be disposed of.

The positioning of the base contact profile in the frame device also offers the advantage that a higher stability of a connection or contacting between the at least one single cell or the at least one conductor tab of the at least one single cell and the base contact profile is achieved, such that a routing of high-voltage currents through the conductor tabs is improved.

In an embodiment the at least one lamella contact is designed as a lamella rail, whereby the lamella rail is formed from at least two lamellas arranged at a distance from one another, whereby the lamellas each exhibit a first lamella end and a second lamella end, whereby adjacent lamellas are connected to each other at their first lamella ends and at their second lamella ends and each form a holding surface, whereby the at least two retaining protrusions of the receiving recess are configured to hold the lamella rail at the holding surfaces. Ordinarily, the lamella rail with the holding surfaces is insertable into the receiving recess with the retaining protrusions.

Typically, the lamellas are designed to be electrically conductive or are made from conductive metal sheets. For example, the lamellas are gold-plated, made of brass or exhibit a brass surface.

By using a lamella rail as a lamella contact for contacting the conductor tab, an overlap area, or an area for contacting between the base contact profile and the at least one conductor tab of at least one adjacent single cell is increased, by which high-voltage currents can be better routed through the contacting. In addition to the area increase of the contacting, a lamella contact designed as a lamella rail also contributes to a more consistent contacting over the entire area of the contacting. As a result, high-voltage currents can be routed more constantly through the contacting.

In an alternative embodiment, the lamella contact is designed as a lamella spiral, whereby the lamella spiral is configured and designed such that it is shapable from a lamella rail and whereby the lamella spiral is limited and held in position by the retaining protrusions of the receiving recess. Ordinarily, the lamella spiral is designed in a bent or formed fashion from a lamella rail with lamella contacts. The lamella contacts consist, for example, of conductive metal sheets, in particular spring steel sheets, which can exhibit a different lamella shape.

In a further embodiment, at least one of the retaining protrusions is designed L-shaped and is arranged perpendicular to the respective receiving recess at the receiving recess, or at least one of the retaining protrusions is arranged in relation to the receiving recess at an angle between 1° and 50°, in particular between 25° and 45°, at the receiving recess.

The L-shaped design of at least one of the retaining protrusions offers the advantage that the base contact profile of the cell connector system forms an integrated mounting system, which is configured to receive a lamella contact. As a result of the angled design, a respective L-shaped retaining protrusion is adaptable to a thickness of a lamella rail. The retaining protrusions of the mounting system of the base contact profile are thus configured to receive lamella rails of different material strengths or thicknesses.

In a further embodiment the cell connector system comprises at least one counter contact element, which is configured to transmit a contact pressure to a conductor tab arranged between the at least one lamella contact and the counter contact element. The counter contact element is configured to stabilize or increase the contacting of the at least one lamella contact of the base contact profile with at least one conductor tab by the contact pressure. The counter contact element allows for an improved contacting of the conductor tab through the lamella contact, whereby there is a lower contact resistance in an area of the surface for contacting or in the overlap area, whereby the guidance of high-voltage currents is improved.

In a further embodiment the at least one counter contact element is designed as a hat contact element, whereby the hat contact element is U-shaped and is configured to be pluggable onto the transition surface of the base contact profile, whereby the hat contact element is configured to form an overlap area with the base contact profile. In the U-shaped hat contact element the overlap area is formed along an interior of the U-shaped hat contact element.

The embodiment of the counter contact element as a hat contact element offers the advantage that a contact pressure on the contacting of the at least one conductor tab by at least one lamella contact can be achieved solely through the design of the counter contact element and thus the cell connector system is configured independently of the neighboring frame device. In the embodiment as a hat contact element the contact pressure is achieved by means of a hat contact element's own clamping force. The hat contact element is configured to form a defined distance from the base contact profile, whereby a uniform force is generated by the defined distance and a spring deflection of the lamella contact.

In a further embodiment, the U-shaped hat contact element exhibits a first hat end and a second hat end, at least one of the hat ends being angled at an angle between 10° and 50°, in particular between 25° and 40°. The angled configuration is designed in the direction of the adjacent frame device. The angled configuration of the U-shaped hat contact element offers the advantage that the hat contact element is designed to be pluggable onto the base contact profile. The angled configuration thus forms a guide that makes it easier to place it on the base contact profile.

Ordinarily, the hat contact element is configured to form an overlap area with the base contact profile in the area of the transition surface of the base contact profile as well as in the area of the first hat end and the second hat end. Thereby, the hat contact element is configured to form the overlap area in the area of the first hat end and the second hat end by the contact pressure on the conductor tab, which is arranged between the respective hat end and the respective lamella contact of the base contact profile. The hat contact element is configured to be placeable onto the base contact profile in a form-fitting manner in the area of the transition surface. The hat contact element is typically configured to incorporate a base contact profile with two mounting systems with lamella contacts incorporated in the respective receiving recesses in a form-fitting and force-fitting manner.

Due to the large overlap area of the hat contact element with the base contact profile, which is achieved in this way, a particularly effective temperature control of the single cell is achievable. A temperature control is a heat supply or a heat dissipation to or from a single cell. This offers the advantage, that the cell connector system is configured to heat or cool at least one single cell of an electrical storage module as required.

In a further embodiment the hat contact element exhibits at least one lamella contact. Generally, at least one hat contact element exhibits at least one lamella contact on an inlying counter contact surface of the hat contact element. This offers the advantage that an installation tolerance can be increased due to an additional spring deflection of the at least one additional lamella contact.

In a further embodiment the counter contact element is configured to transmit a contact pressure to the conductor tab arranged between the at least one lamella contact and the counter contact element by means of compression produced by a pressure goggle, whereby the counter contact element is configured as a counter contact sheet or as a counter contact rail. The compression generated by the pressure goggles usually takes place through a pretension of a cell block or of the electrical storage module.

In a further embodiment the at least one counter contact sheet or the at least one counter contact rail is attachable to at least one side surface of a second frame device adjacent to the at least one frame device. The counter contact rail is configured to be screwable for instance to the at least one frame device, weldable by means of plastic dowels or clickable into place through a tongue and groove system. The positioning of the counter contact sheet or the counter contact rail on the side surface of the at least one frame device offers the advantage that the at least one counter contact sheet or the at least one counter contact rail is arranged on the at least one frame device in such a way that a lamella contact, which is arranged in a base contact profile of an adjacent frame device can be contacted over a large area.

In a further embodiment the at least one counter contact sheet is designed L-shaped with a first leg and a second leg, whereby the counter contact sheet in the state of being placed on the base contact profile is configured to connect the base contact profile with at least one of the legs, in particular both legs. The L-shaped configuration of the counter contact sheet increases the overlap area of the counter contact elements, which is designed as a counter contact sheet, so that a temperature control, in particular a heat dissipation, is improved. For example, the counter contact sheet is screwable onto a frame device, weldable by means of plastic dowels or clickable into place through a tongue and groove system.

The counter contact element can thus be configured as a counter contact sheet, whereby the base contact profile of the cell connector system with the at least one lamella contact is arranged on a first frame device and the counter contact sheet is arranged on at least one second frame device adjacent to the first frame device and arranged laterally opposite to the base contact profile.

The counter contact element can alternatively be configured as a counter contact rail, whereby the base contact profile of the cell connector system with the at least one lamella contact is arranged on a first frame device and the counter contact rail is arranged on at least one second frame device adjacent to the first frame device and arranged laterally opposite to the base contact profile.

In a further embodiment the at least one counter contact rail is configured to completely incorporate at least one lamella contact, whereby the cell connector system is releasably electrically contactable by means of the at least one lamella contact with a conductor tab of at least one adjacent electrical single cell.

The present invention also relates to an electrical storage module for at least one single cell, whereby the electrical storage module comprises at least two single cells interconnected in parallel or in series, each comprising at least one conductor tab, and each arranged in a frame device.

According to the invention at least one of the at least two frame devices exhibits at least one cell connector system with a counter contact element.

In one embodiment the counter contact element is configured as a hat contact element. In a corresponding embodiment, the at least two frame devices of the electrical storage module alternately exhibit the cell connector system according to the invention with a counter contact element according to the invention configured as a hat contact element.

In a further optional alternative embodiment, the frame device is configured to be compressible by means of a pressure goggle. Generally, the electrical storage module is configured to compress the frame devices based on a compression generated by the pressure goggle and to transmit a contact pressure to a conductor tab arranged between a lamella contact and a counter contact element. The compression generated by the pressure goggle usually takes place by means of a pretension of a cell block or of the electrical storage module.

In a further embodiment the counter contact element is at least one counter contact sheet or at least one counter contact rail.

The electrical storage module is configured to incorporate at least one cell connector system with a counter contact element. In an embodiment of the electrical storage module with at least two cell connector systems, the above-described embodiments of the cell connector system and in particular of the counter contact element can be combined with one another.

BRIEF DESCRIPTION OF THE DRAWINGS

The invention is shown in the drawing schematically based on embodiments and is described further with reference to the drawing, the same components being identified by the same reference numbers. It shows.

DETAILED DESCRIPTION OF EXAMPLE EMBODIMENTS OF THE INVENTION

Figure 1:
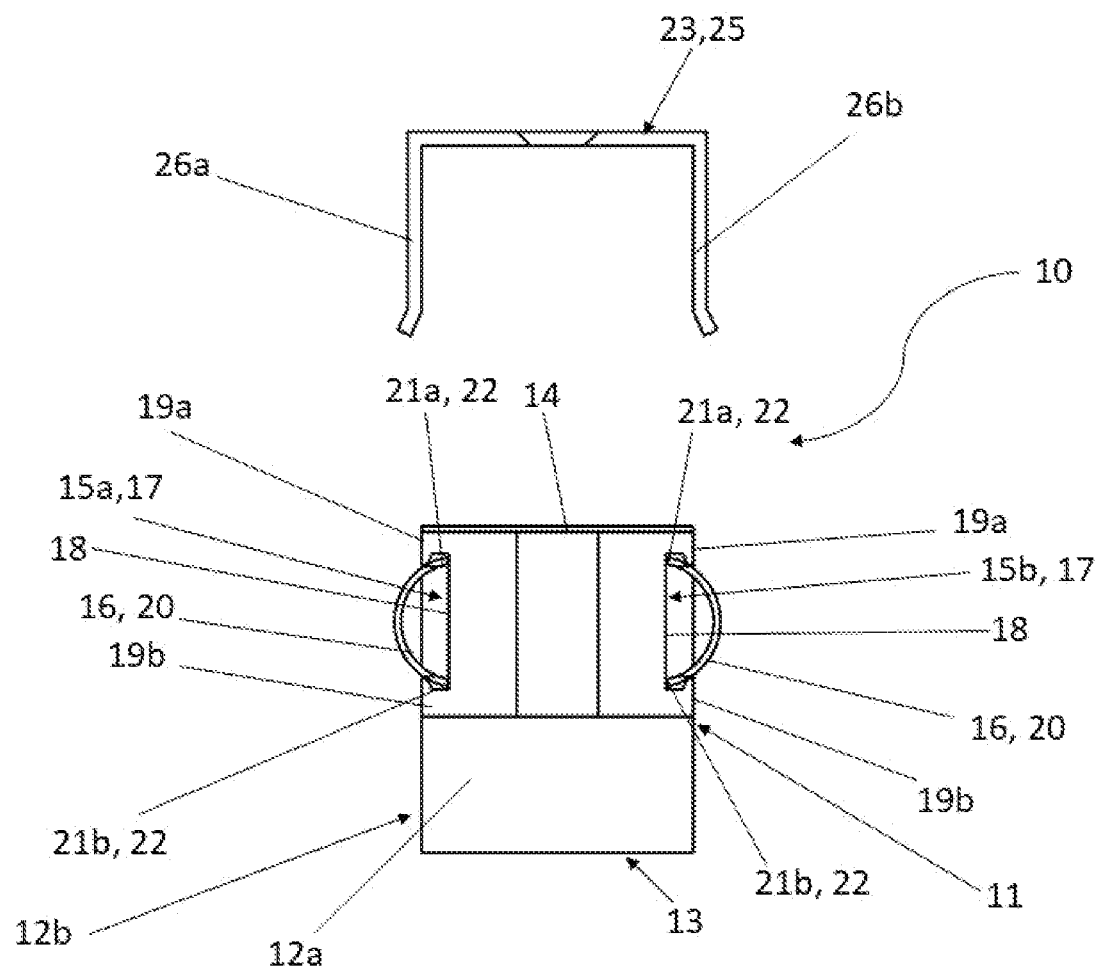
FIG. 1 a side view of an embodiment of a cell connector system according to the invention with a counter contact element configured as a hat contact element, FIG. 2 a side view of a contacting of the cell connector system 10—shown in FIG. 1—to at least one conductor tab 24 of a single cell 33, FIG. 3 an exploded view of the embodiment of the cell connector system—shown in FIGS. 1 and 2—, FIG. 4 a perspective side view of an embodiment of a storage module according to the invention with three frame devices, whereby one of the three frame devices comprises the embodiment of the cell connector system according to the invention with the counter contact element configured as a hat contact element—shown in FIGS. 1 to 3—, FIG. 5 a side view of an embodiment of the electrical storage module with five frame devices, whereby the frame devices alternately each comprise the cell connector system according to the invention—shown in FIGS. 1 to 3—with the counter contact element designed as a hat contact element, FIG. 6 a perspective side view of a further embodiment of the cell connector system according to the invention with a counter contact element designed as a counter contact sheet, FIG. 7 a perspective side view of an embodiment of a storage module according to the invention with three frame devices, whereby one of the three frame devices comprises the base contact profile of the embodiment of the cell connector system according to the invention—shown in FIG. 6—and at least one further of the three frame devices comprises at least one counter contact element of the cell connector system designed as a counter contact sheet, FIG. 8 a side view of an embodiment of the electrical storage module with five frame devices, whereby the frame devices alternately each comprise a base edge profile of the cell connector system according to the invention or a counter contact element of the cell connector system designed as a counter contact sheet, FIG. 9 a perspective side view of a further embodiment of the cell connector system according to the invention with at least one counter contact element designed as a counter contact rail, FIG. 10 the embodiment of the cell connector system—shown in FIG. 9—in a condition inserted into a frame device, FIG. 11 a perspective side view of an embodiment of a storage module according to the invention with three frame devices, whereby one of the three frame devices comprises the base contact profile of the embodiment of the cell connector system according to the invention—shown in FIGS. 9 and 10—and at least one further of the three frame devices comprises at least one counter contact element of the cell connector system designed as a counter contact rail.

FIG. 1 shows a side view of an embodiment of a cell connector system 10 according to the invention with a counter contact element 23 designed as a hat contact element 25.

The cell connector system 10 is configured for at least one single cell (not shown in FIG. 1) with at least one conductor tab, whereby the single cell is insertable into an electrical storage module (not shown in FIG. 1) that comprises at least one frame device.

In the present embodiment, the cell connector system 10 comprises a base contact profile 11, whereby the base contact profile 11 includes two fronts or end surfaces 12a, 12b, a support surface 13, a transition surface 14 and two mutually opposite facing contact surfaces 15a, 15b. The support surface 13 is arranged opposite the transition surface 14, whereby the support surface 13 is configured to be placed in or on a frame device or a frame.

The transition surface 14 is configured to ensure heat conduction to a temperature control unit by means of a thermal conducting foil (not shown in FIG. 1). The temperature control unit is optionally a cooling unit or a heating unit. The transition surface 14 is also configured to receive a counter contact element 23 designed as a hat contact element 25. In the present embodiment, the transition surface 14 is configured to receive the hat contact element 25 mounted onto it.

In the present embodiment, the base contact profile 11 comprises a mounting system 17 on each of the opposing contact surfaces 15a, 15b. The mounting system 17 comprises a receiving recess 18, which comprises a retaining protrusion 19a, 19b respectively on both sides. In this embodiment the retaining protrusions 19a, 19b are L-shaped, whereby the receiving recess 18 with the two retaining protrusions 19a, 19b is configured to receive a lamella contact 16 inserted into the receiving recess 18. Generally, the lamella contact 16 consists of at least one lamella 20, which exhibits a first lamella end 21a and a second lamella end 21b.

In the present embodiment, the lamella contact 16 is designed as a lamella rail, which is formed from a majority of lamellas 20, whereby the lamellas 20 are connected to one another at their first lamella ends 21a and at their second lamella ends 21b. Thereby, a respective lamella contact 16 is configured to conduct an electrical current from a conductor tab (not shown in FIG. 1) of an individual cell (not shown in FIG. 1).

The counter contact element 23 designed as a hat contact element 25 is configured to be placeable on the base contact profile 11 with, in the present embodiment, the lamella contacts 16 being formed on both sides on a respective contact surface 15a, 15b of the base contact profile 11.

In the present embodiment, the hat contact element 25 is U-shaped, whereby the hat contact element 25 comprises a first hat end 26a and a second hat end 26b, whereby the hat ends 26a, 26b are each formed angled. The hat contact element 25 with the first hat end 26a and the second hat end 26b is configured to press a conductor tab (not shown in FIG. 1) of an electrical single cell onto at least one lamella contact 16 of the base contact profile 11. The U-shaped hat contact element 25 can be placed in a form-fitting manner onto the base contact profile 11 and onto a conductor tab (not shown in FIG. 1).

Figure 2:
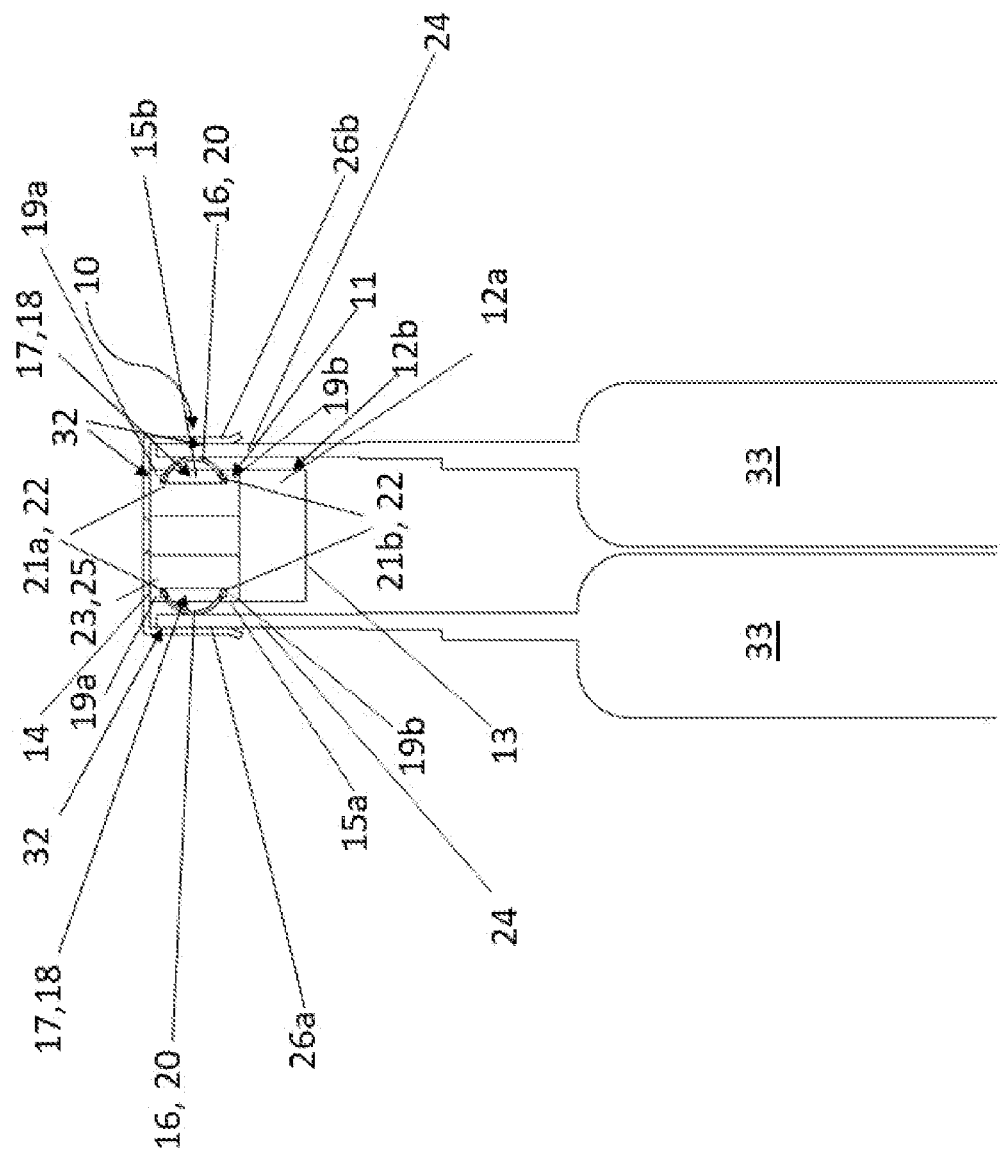

FIG. 2 shows a contacting of the cell connector system 10—shown in FIG. 1—on at least one conductor tab 24 of a single cell 33. The cell connector system 10 is thus configured for contacting at least one single cell. In the present embodiment, the cell connector system 10 is arranged between two conductor tabs 24 of two single cells 33 and is thus configured for contacting two single cells 33.

The base contact profile 11 is arranged between the two conductor tabs 24, whereby the counter contact element 23 designed as a hat contact element 25 is placed on the base contact profile 11 in such a way that the first hat end 26a and the second hat end 26b of the hat contact element 25 each press one of the conductor tabs 24 on a respective lamella contact 16 of the base contact profile 11. Thereby, the hat contact element 25 respectively forms an overlap area 32 with the transition surface 14 and with the conductor tabs 24, which overlap area is configured to conduct a high-voltage current and to transport heat.

The base contact profile 11 has the fronts or end surfaces 12a, 12b, the support surface 13, the transition surface 14 and the contact surfaces 15a, 15b. In the embodiment shown, each of the contact surfaces 15a, 15b has a mounting system 17, which is designed as a receiving recess 18 with the retaining protrusions 19a, 19b and is configured to receive the respective lamella contact 16, which is formed from at least one lamella 20. The respective lamella contact 16 is configured as a lamella rail, whereby the individual lamellas 20 of the lamella rail are connected to one another respectively at a first lamella end 21a and a second lamella end 21b, and respectively each forms a holding surface 22.

Figure 3:
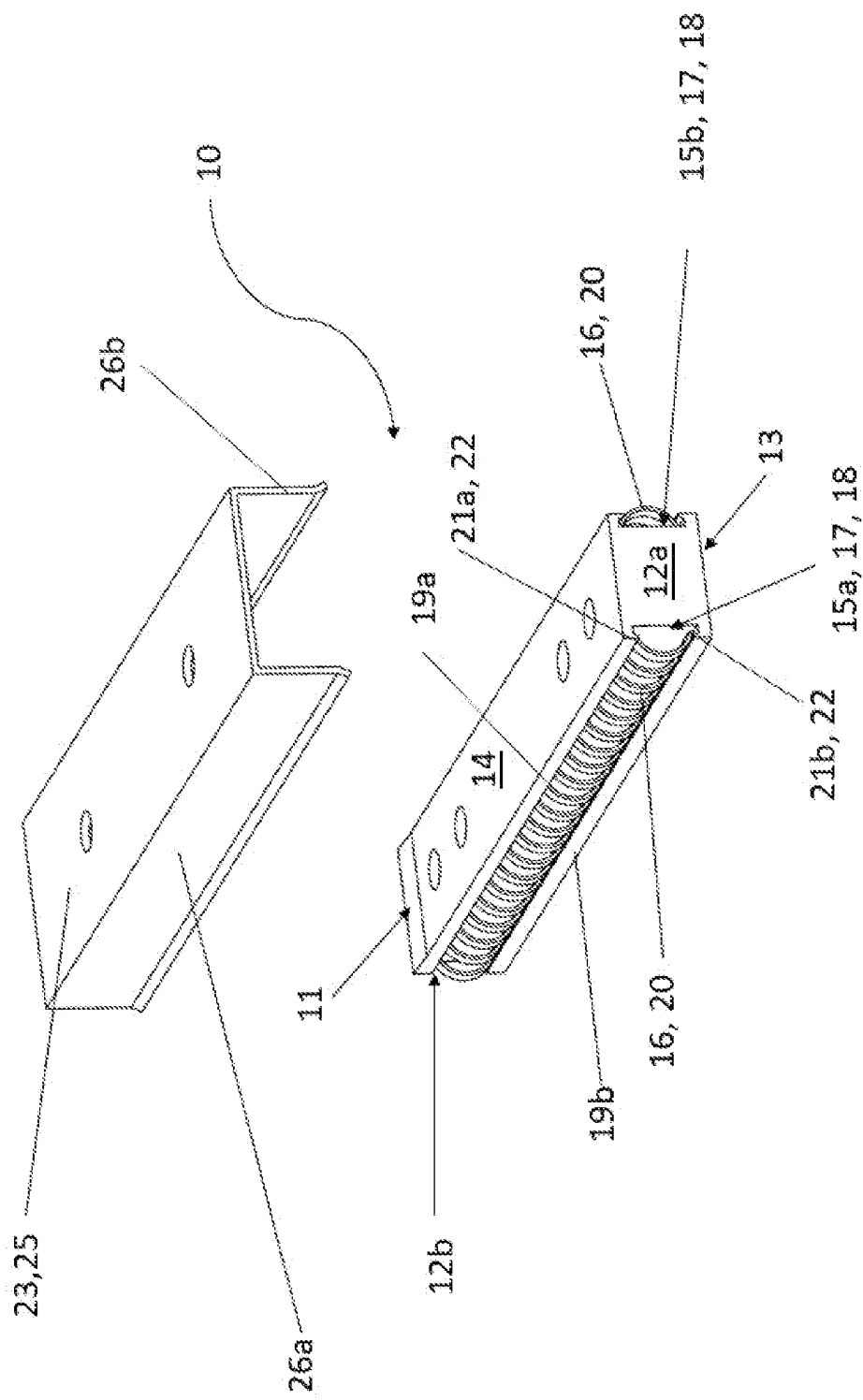

FIG. 3 shows an exploded view of the embodiment of the cell connector system 10 shown in FIGS. 1 and 2. The cell connector system 10 comprises the base contact profile 11 with the fronts or end surfaces 12a, 12b, the support surface 13 as well as the transition surface 14 with the contact surfaces 15a, 15b. A respective contact surface 15a, 15b exhibits a respective mounting system 17 with the receiving recess 18 and the retaining protrusions 19a, 19b. A lamella contact 16 consisting of lamellas 20 is arranged inserted into a respective receiving recess 18, whereby the lamella contact 16 is held in the receiving recess 18 of the mounting system 17 by the retaining protrusions 19a, 19b. For this purpose, the retaining protrusions 19a, 19b are generally designed U-shaped or angled.

Furthermore, in FIG. 3 the counter contact element 23 designed as a hat contact element 25 is shown. The hat contact element 25 has the first hat end 26a and the second hat end 26b, whereby the first hat end 26a and the second hat end 26b each are designed angled. The hat contact element 25 is configured to be placeable onto the base contact profile 11.

Figure 4:
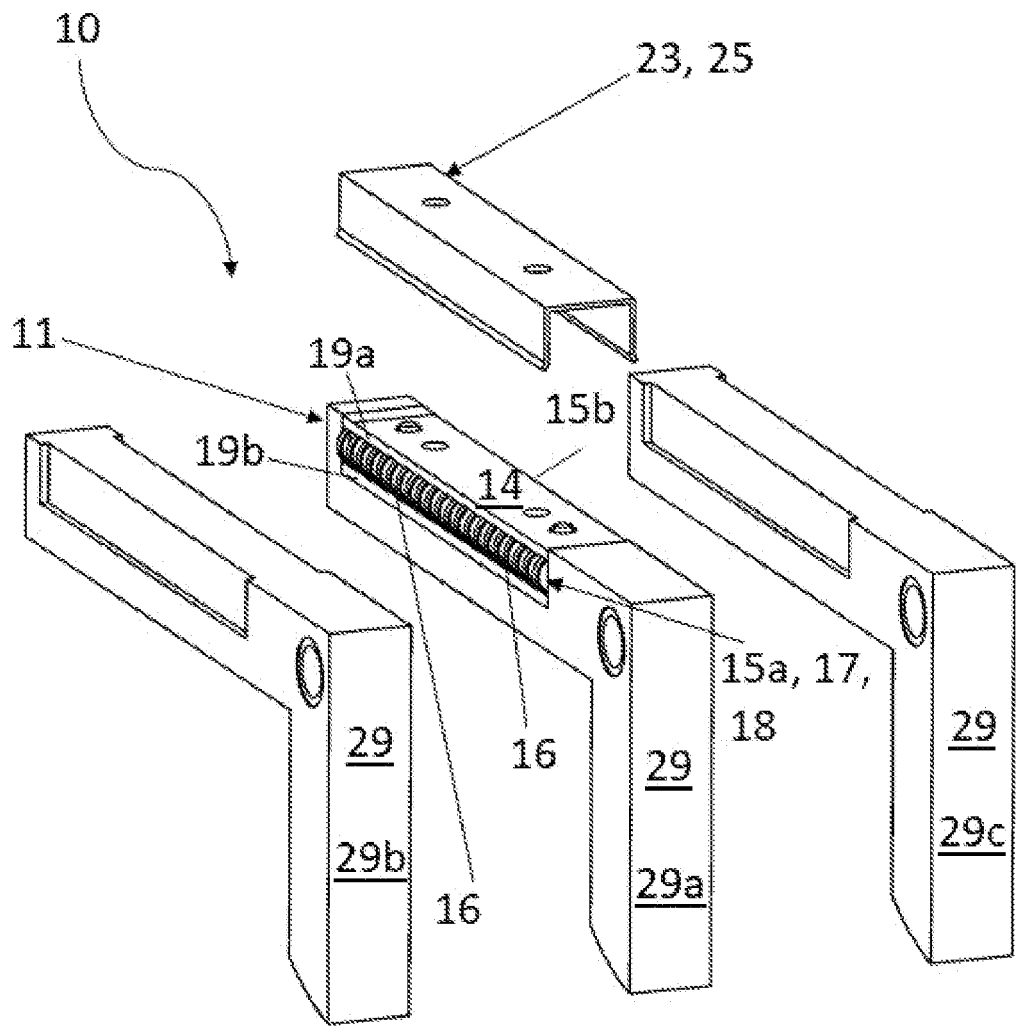

FIG. 4 shows a perspective side view of an embodiment of a storage module according to the invention with three frame devices 29, whereby one of the three frame devices 29, 29a comprises the embodiment of the cell connector system according to the invention—shown in FIGS. 1 to 3—with the counter contact element 23 designed as a hat contact element 25.

The base contact profile 11 of the cell connector system 10 is designed inserted into the frame device 29, 29a. The base contact profile 11 is inserted into the frame device 29a with the—not shown—support surface 13. The contact surfaces 15a, 15b are each formed laterally in the direction of one of the adjacent frame devices 29b, 29c on the base contact profile 11.

In the present embodiment it is shown that at least the contact surface 15a exhibits the mounting system 17 with the receiving recess 18 and the retaining protrusions 19a, 19b, whereby the receiving recess 18 receives at least one lamella contact 16. The hat contact element 25 is placeable onto the base contact profile 11 with the at least one lamella contact 16.

Figure 5:
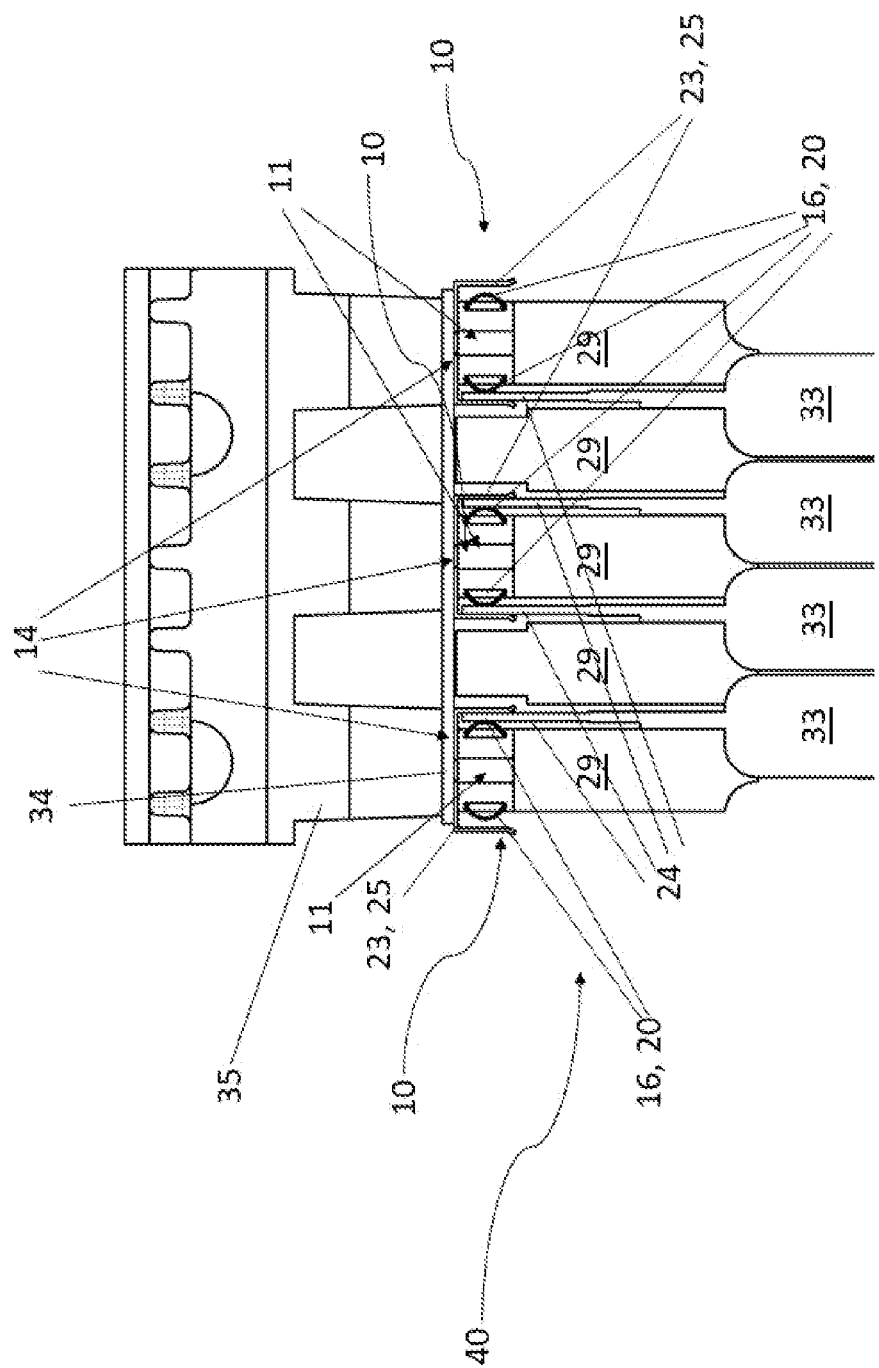

FIG. 5 shows a side view of an embodiment of the electrical storage module 40 with five frame devices 29, whereby the frame devices 29 each alternately comprise the cell connector system 10 according to the invention—shown in FIGS. 1 to 3—with the counter contact element 23 designed as a hat contact element 25.

The frame devices 29 alternately each exhibit the base contact profile 11, whereby the base contact profile 11 comprises on both sides a lamella contact 16 consisting of lamellas 20. The respective conductor tabs 24 of the single cells 33 are arranged between the respective frame devices 29. The counter contact element 23 designed as a hat contact element 25 is respectively configured to press the respective conductor tab 24 of a single cell 33 against the respective lamella contact 16, whereby due to the configuration as a hat contact element 25 the frame devices 29 alternately exhibit the hat contact element 25. The hat contact element 25 is configured to provide contacting with the temperature control unit 35 by means of a thermal conductive foil 34.

The electrical storage module 40 designed in this way is configured to provide a temperature control of the single cells of the electrical storage module 40 by means of the transition surface 14 of the respective base contact profiles 11.

Figure 6:
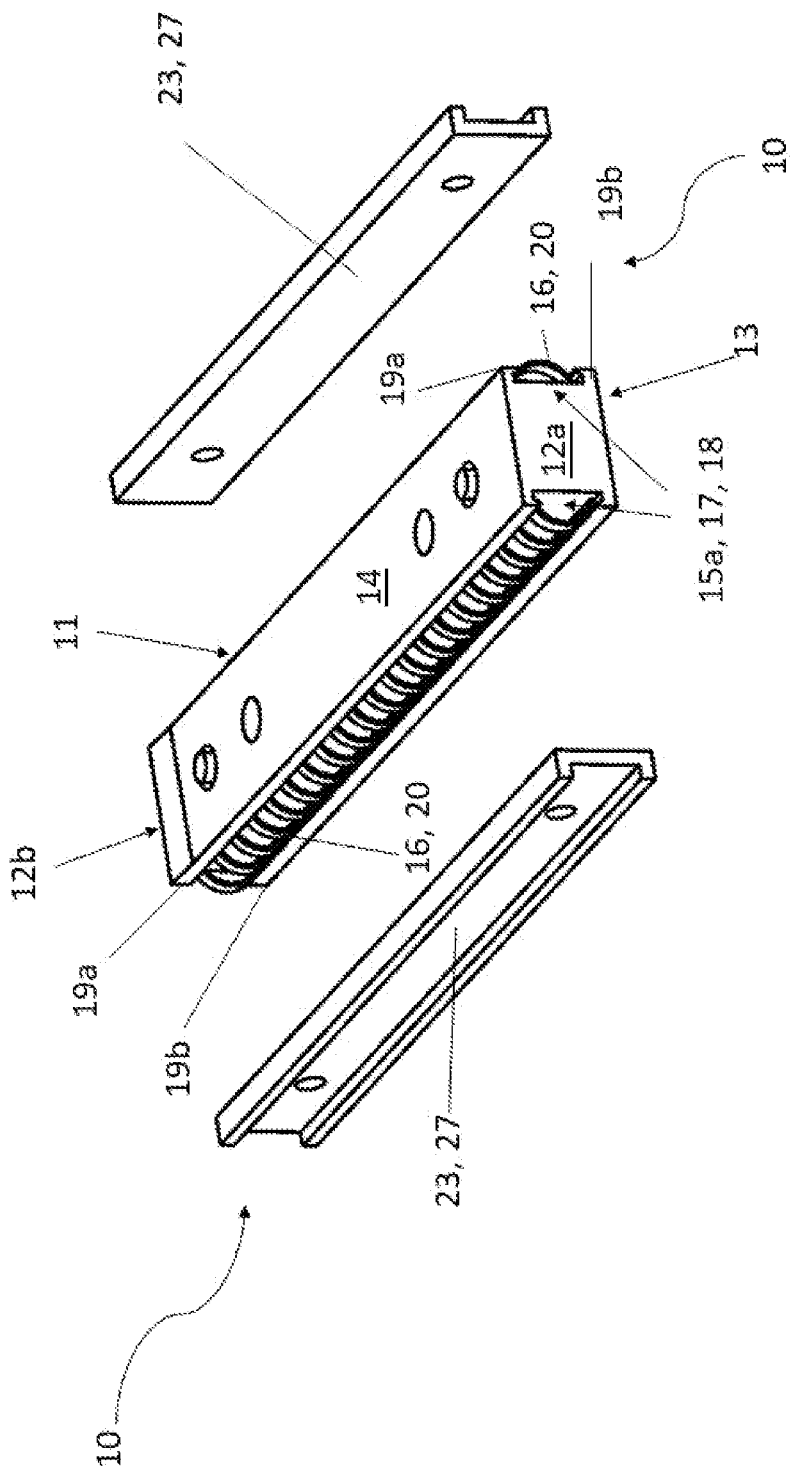

FIG. 6 shows a perspective side view of a further embodiment of the cell connector system 10 according to the invention with a counter contact element 23 designed as a counter contact sheet 27. The base contact profile 11 with the support surface 13, the transition surface 14, the fronts i.e. end surfaces 12a, 12b and the contact surfaces 15a, 15b are shown.

In the present embodiment each of the contact surfaces 15a, 15b exhibits the mounting system 17 with the receiving recess 18 and the retaining protrusions 19a, 19b. The receiving recesses 18 each exhibit at least one lamella contact 16 consisting of lamellas 20. The lamella contacts 16 exhibit holding surfaces—not shown—, which are configured to hold a respective lamella contact 16 in a respective receiving recess 18.

Also shown are the counter contact elements 23, each designed as a counter contact sheet 27, which are configured to be pressable onto the lamella contacts 16 of a respective receiving recess 18 when pressure is applied to the respective lamella contacts 16 by pressure goggles—not shown.

Figure 7:
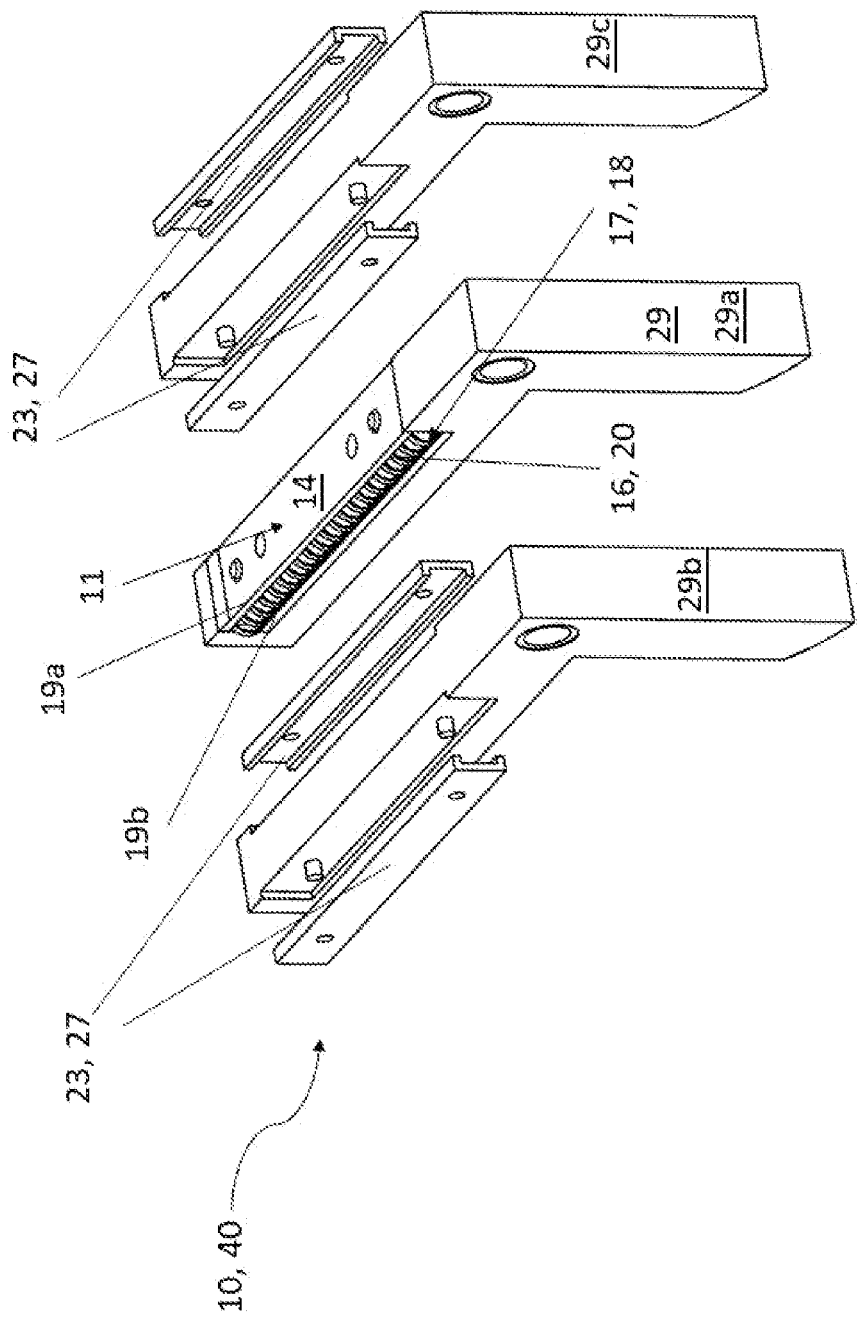

FIG. 7 shows a perspective side view of an embodiment of a storage module 40 according to the invention with three frame devices 29, whereby one of the three frame devices 29 comprises the base contact profile 11 of the embodiment of the cell connector system 10 according to the invention—shown in FIG. 6—and at least one further of the three frame devices 29 comprises at least one counter contact element 23 of the cell connector system 10 designed as a counter contact sheet 27.

The frame device 29a comprises the base contact profile 11 of the cell connector system 10 with the transition surface 14 and the lamella contact 16 with the lamellas 20, which is arranged in the mounting system 17 in the receiving recess 18. In the present embodiment the frame devices 29b, 29c, which are arranged adjacent to the frame device 29a each exhibit a counter contact element 23 designed as a counter contact sheet 27. The counter contacts sheets 27 are each respectively attached laterally opposite to a contact surface 15a, 15b. which is configured with a mounting system 17, at one of the frame devices 29b, 29c.

Figure 8:
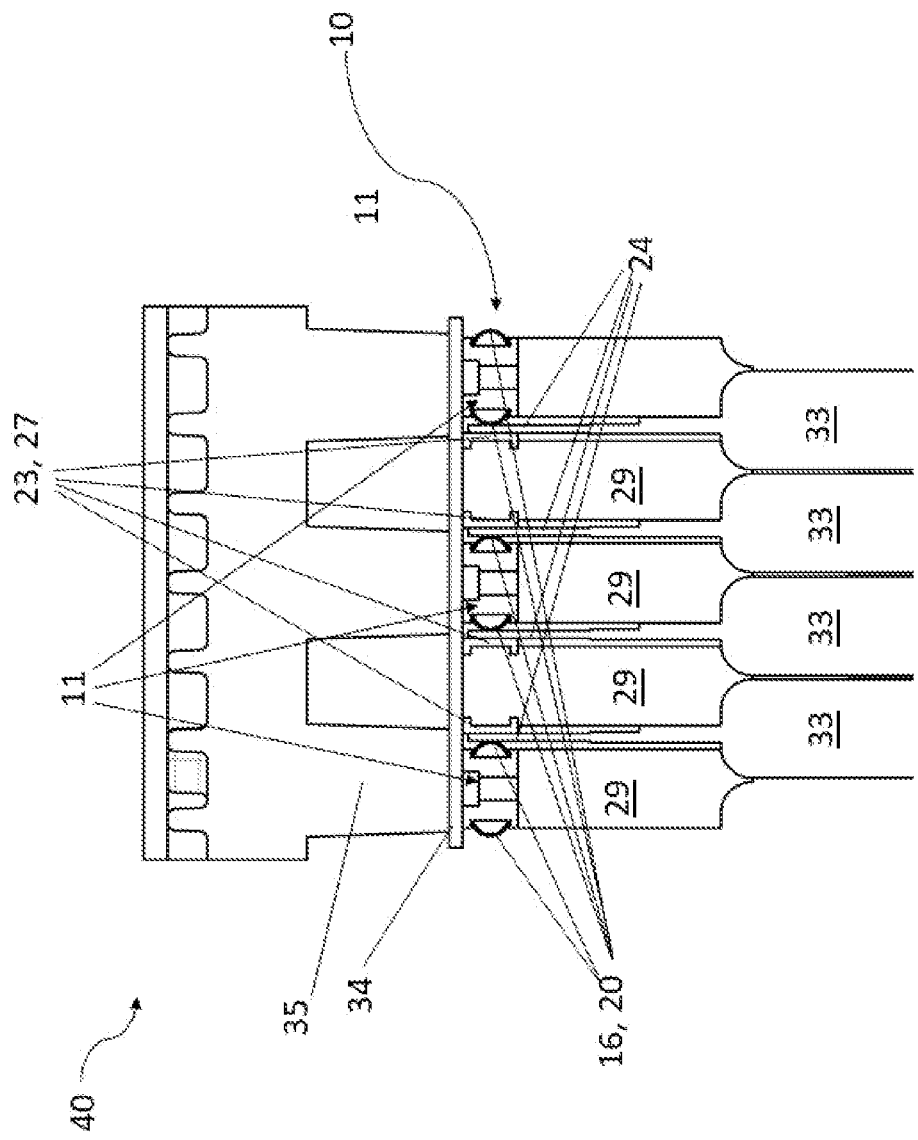

FIG. 8 shows a side view of an embodiment of the electrical storage module 40 with five frame devices 29, whereby the frame devices 29 each alternately carry thereon either a base contact profile 11 of the cell connector system 10 according to the invention or a counter contact element 23 of the cell connector system 10 designed as a counter contact sheet 27.

The frame devices 29 alternately each respectively carry the base contact profile 11 or the counter contact sheet 27, whereby the base contact profile 11 respectively comprises on both sides a lamella contact 16 consisting of lamellas 20. The respective conductor tabs 24 of the single cells 33 are arranged between the respective frame devices 29.

The base contact profile 11 is arranged in one of the frame devices 29, whereby the counter contact sheet 27 is arranged on at least one frame device 29 adjacent to the frame device 29 with the base contact profile 11. The counter contact sheet 27 is respectively configured to press the respective conductor tab 24 of the respective single cell 33 onto the respective lamella contact 16 of the base contact profile 11.

The present embodiment is thus configured in such a way that a respective one of the conductor tabs 24 is respectively contacted by a lamella contact 16 and by a counter contact sheet 27.

Figure 9:
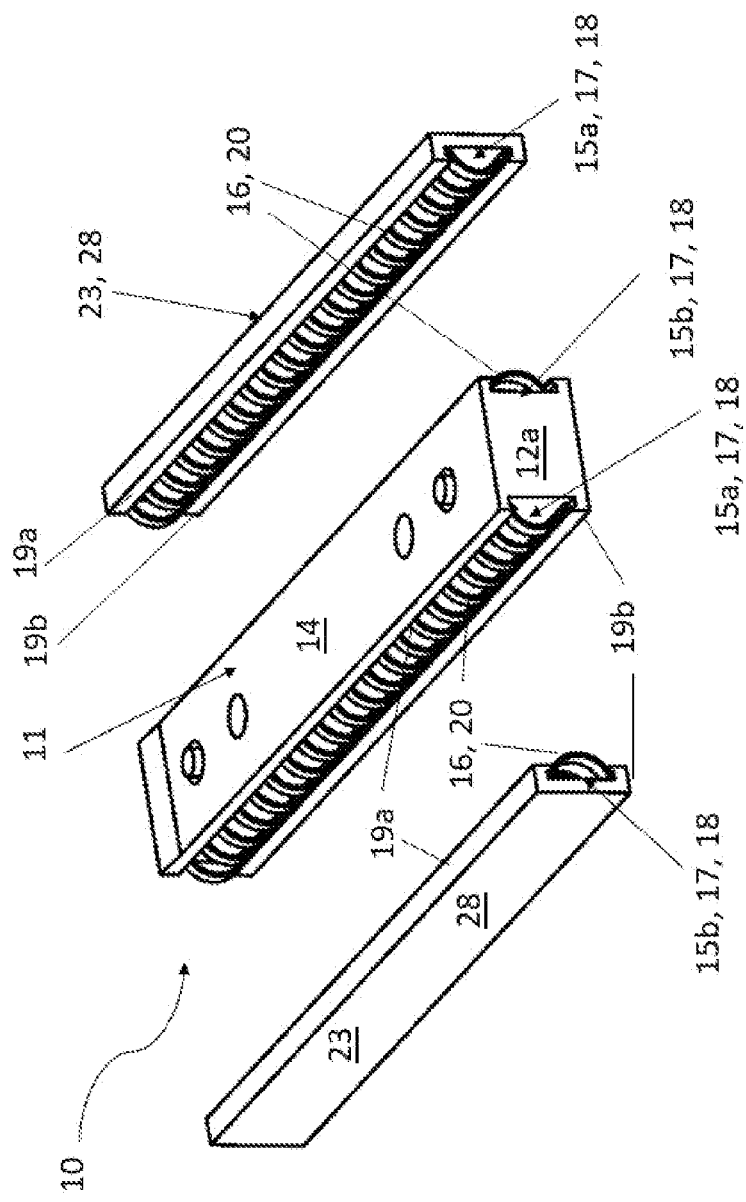

FIG. 9 shows a perspective side view of a further embodiment of the cell connector system 10 according to the invention with at least one counter contact element 23 designed as a counter contact rail 28. The base contact profile 11 with the support surface 13, the transition surface 14, the fronts i.e. end surfaces 12a, 12b and the contact surfaces 15a, 15b are shown.

In the present embodiment, a respective one of the contact surfaces 15a, 15b exhibits the mounting system 17 with the receiving recess 18 and the retaining protrusions 19a, 19b. Each of the receiving recesses 18 exhibits at least one lamella contact 16 consisting of lamellas 20.

Also shown are two counter contact elements 23 designed as counter contact rails 28, which are configured to be pressable onto the lamella contacts 16 of a respective receiving recess 18 when pressure is applied to the respective lamella contacts 16 by means of a pressure goggle—not shown. In this case, a respective counter contact rail 28 is configured to press on a conductor tab—not shown—, which is arranged between the counter contact rail 28 and a lamella contact 16 of a receiving recess 18 of a base contact profile 11.

A respective counter contact rail 28 has a mounting system 17 with a receiving recess 18 and retaining protrusions 19a, 19b, whereby the receiving recess 18 receives at least one lamella contact 16 with lamellas 20. When pressed together by a pressure goggle, there is thus a bilateral lamella contact on a conductor tab.

Figure 10:
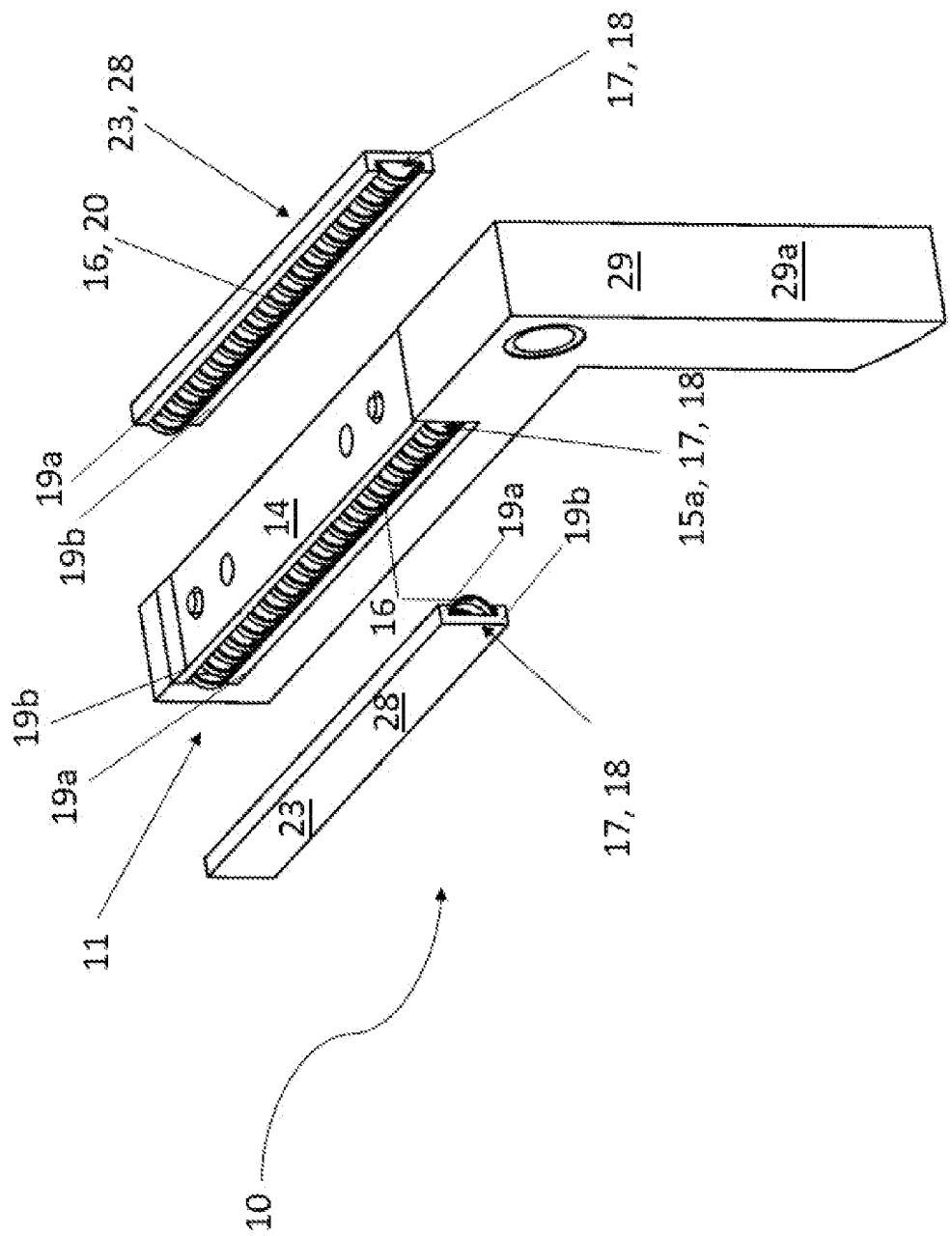

FIG. 10 shows the embodiment of the cell connector system 10—shown in FIG. 9—in a state inserted into a frame device 29a. The frame device 29a comprises the base contact profile 11 of the cell connector system 10 with the transition surface 14 and the lamella contact 16 with the lamellas 20, which is arranged in the mounting system 17 in the receiving recess 18.

In the present embodiment, the frame devices 29b, 29c arranged adjacent to the frame device 29a each exhibits a counter contact element 23 designed as a counter contact rail 28. The counter contact rails 28 are each attached laterally opposite to a contact surface 15a, 15b configured with a mounting system 17 on one of the frame devices 29b, 29c.

The counter contact rails 28 each exhibit a mounting system 17 with a receiving recess 18 and retaining protrusions 19a, 19b, whereby the receiving recess 18 is configured to receive at least one lamella contact 16. A respective counter contact rail 28 is configured to press on a conductor tab—not shown here—arranged between the counter contact rail 28 and a lamella contact 16 of a receiving recess 18 of a base contact profile 11.

Figure 11:
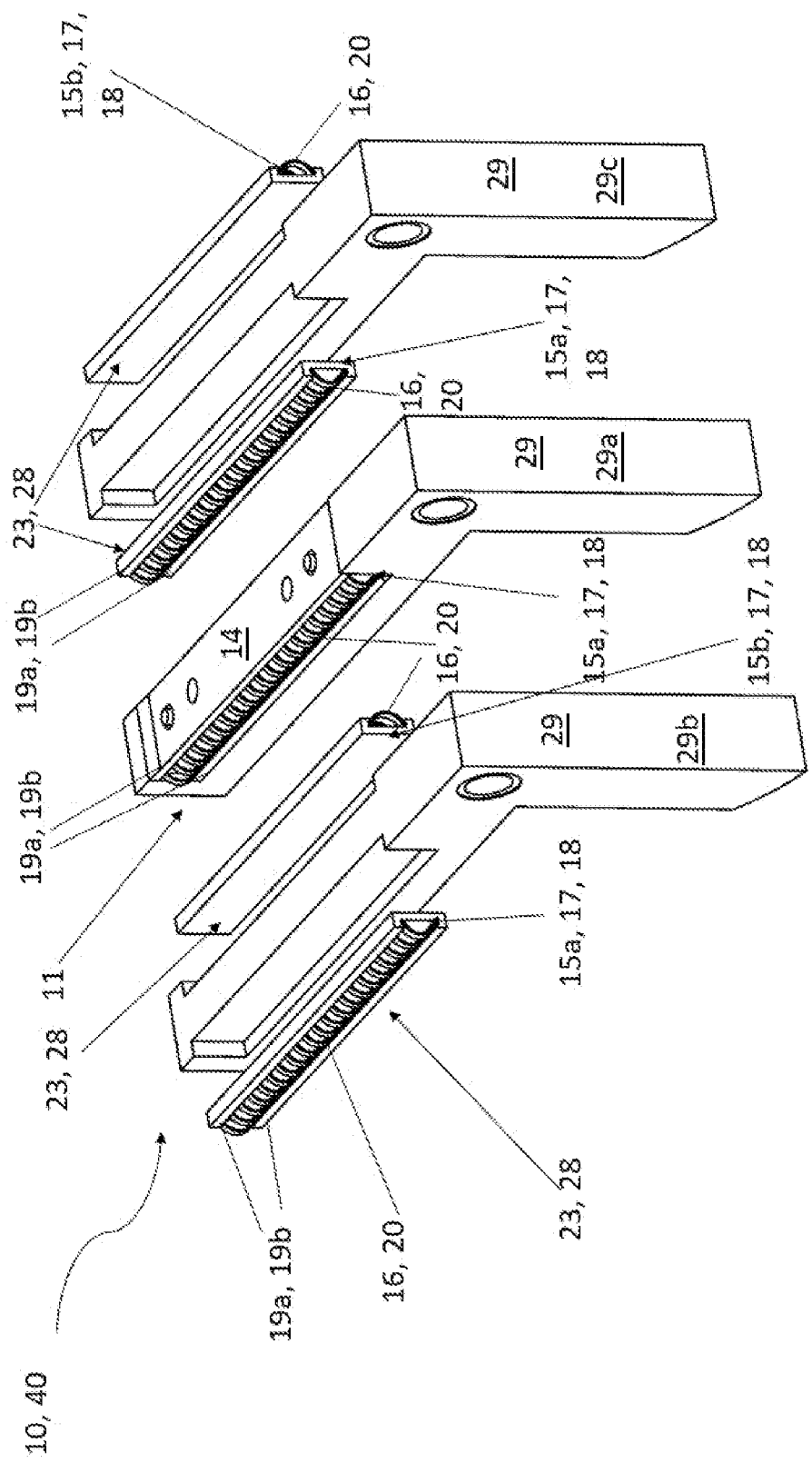

FIG. 11 shows a perspective side view of an embodiment of the storage module 40 according to the invention with three frame devices 29, whereby one of the three frame devices 29 comprises the base contact profile of the embodiment of the cell connector system 10 according to the invention—shown in FIGS. 9 and 10—, and at least one further of the three frame devices 29 comprises at least one counter contact element of the cell connector system designed as a counter contact rail 28.

The frame device 29a comprises the base contact profile 11 of the cell connector system 10 with the transition surface 14 and the lamella contact 16 with the lamellas 20, which is arranged in the mounting system 17 in the receiving recess 18.

In the present embodiment, the frame devices 29b, 29c arranged adjacent to the frame device 29a each exhibit two counter contact elements 23 designed as counter contact rails 28. The counter contact rails 28 are each attached laterally opposite to a contact surface 15a, 15b configured with a mounting system 17 on one of the frame devices 29b, 29c.

The counter contact rails 28 each exhibit the mounting system 17 with the receiving recess 18 and the retaining protrusions 19a, 19b, whereby the respective receiving recess 18 is configured to receive at least one lamella contact 16. The respective counter contact rail 28 is configured to press on a conductor tab—not shown here—arranged between the counter contact rail 28 and the lamella contact 16 of the base contact profile 11.

In another embodiment, the base contact profile 11 is formed tapered toward the transition surface 14, and the hat contact element 25 is formed tapered to correspond to the base contact profile 11.

In a further embodiment, the receiving recess 18 comprises two dovetail-like recesses, each formed in the area of one of the retaining protrusions 19a, 19b and at an angle between 100° and 150°, in particular between 101° and 120°, to a respective contact surface 15a, 15b of the base contact profile 11.

LIST OF REFERENCE SIGNS 10 cell connector system
11 base contact profile
12a, 12b fronts or end surfaces
13 support surface
14 transition surface
15a, 15b contact surfaces
16 lamella contact
17 mounting system
18 receiving recess
19a, 19b retaining protrusions
20 lamellas
21a, 21b first end, second end of a lamella
22 holding surfaces
23 counter contact element
24 conductor tab
25 hat contact element
26a, 26b first hat end, second hat end
27 counter contact sheet
27a, 27b first and second leg of a counter contact sheet
28 counter contact rail
29 frame device
29a, 29b first and second frame devices
30 side surface face of a second frame device
32 overlap area
33 single cell
34 thermal conductive foil
35 temperature control unit
40 electrical storage module

The invention claimed is:

1. A cell connector system for connecting at least one single cell of an electrical storage module,
wherein the single cell has at least one conductor tab and the electrical storage module further has at least one frame device,
wherein the cell connector system comprises at least one lamella contact and a base contact profile having at least two end surfaces, a support surface, a transition surface and two mutually opposite facing contact surfaces,
wherein the base contact profile is configured to be placeable with the support surface on at least a first one of the at least one frame device,
wherein at least one of the contact surfaces is configured as a mounting system having a receiving recess configured to receive the at least one lamella contact and at least two retaining protrusions configured to retain the at least one lamella contact, and
wherein the cell connector system is configured to establish a separable electrical connection by the at least one lamella contact to the at least one conductor tab of the at least one single cell,
wherein the cell connector system further comprises at least one electrically conductive counter contact element, which is configured to transmit a contact pressure to a first one of the at least one conductor tab, which is arranged between the at least one lamella contact and the counter contact element.

2. The cell connector system according to claim 1, wherein the at least one lamella contact forms a lamella rail comprising at least two lamellas that are arranged spaced apart from one another, wherein each one of the lamellas respectively comprises a first lamella end and a second lamella end, wherein adjacent ones of the lamellas are connected to one another at the respective first lamella ends thereof and at the respective second lamella ends thereof and each respectively form a holding surface, and wherein the at least two retaining protrusions are configured to hold the lamella rail at the holding surfaces.

3. The cell connector system according to claim 1, wherein the lamella contact is configured as a lamella spiral that is shapable from a lamella rail, and that is bounded and held in position by the retaining protrusions.

4. The cell connector system according to claim 1, wherein at least one of the retaining protrusions is L-shaped and is arranged extending perpendicular to the receiving recess at an edge of the receiving recess, or at least one of the retaining protrusions includes at least a portion thereof extending at an angle between 1° and 50° relative to the receiving recess at an edge of the receiving recess.

5. The cell connector system according to claim 1, wherein the at least one counter contact element comprises a hat contact element that is U-shaped and is configured to be pluggable onto the transition surface of the base contact profile, wherein the hat contact element is configured to overlap with the base contact profile in an overlap area.

6. The cell connector system according to claim 5, wherein the hat contact element comprises a first hat end and a second hat end, and wherein at least one of the hat ends includes two portions that are angled at an angle between 10° and 50° relative to one another.

7. The cell connector system according to claim 5, further comprising at least one secondary lamella contact carried by the hat contact element.

8. The cell connector system according to claim 5, wherein the hat contact element comprises a first hat end and a second hat end that overlap with the base contact profile in the overlap area, and that transmit the contact pressure to the first conductor tab, which is arranged between the first hat end and the at least one lamella contact of the base contact profile, wherein the overlap area is formed along an inner side of the hat contact element.

9. The cell connector system according to claim 5, wherein the hat contact element is configured to be placeable onto the base contact profile in a form-fitting manner in an area of the transition surface.

10. The cell connector system according to claim 5, wherein the base contact profile is tapered toward the transition surface, and the hat contact element is tapered to correspond to the base contact profile.

11. The cell connector system according to claim 1, wherein the counter contact element is configured to transmit the contact pressure to the first conductor tab by compression produced by a pressure goggle, and wherein the counter contact element comprises a counter contact sheet or a counter contact rail.

12. The cell connector system according to claim 11, wherein the at least one frame device of the electrical storage module includes the first frame device and a second frame device adjacent to one another, and wherein the counter contact sheet or the counter contact rail is attachable to at least one side surface of the second frame device.

13. The cell connector system according to claim 11, wherein the counter contact element comprises the counter contact sheet, which is L-shaped and includes a first leg and a second leg, and wherein, in a state in which the counter contact sheet is placed on the base contact profile, the counter contact sheet is configured to connect the base contact profile with at least one of the first and second legs.

14. The cell connector system according to claim 11, wherein the counter contact element comprises the counter contact rail and at least one secondary lamella contact that is mounted in the counter contact rail, wherein the cell connector system is configured to establish the separable electrical connection to the at least one conductor tab which is received between the at least one lamella contact and the at least one secondary lamella contact.

15. The cell connector system according to claim 1, wherein the receiving recess comprises two dovetail-like recesses respectively formed in the retaining protrusions at an angle between 100° and 150° to a respective one of the contact surfaces.

16. An electrical storage module comprising at least one said cell connector system according to claim 1, frame devices and at least two single cells, wherein the single cells are interconnected in parallel or in series, each respectively comprise at least one conductor tab, and are supported by the frame devices, and wherein the at least one cell connector system is provided on at least one of the frame devices.

17. The electrical storage module according to claim 16, wherein the at least one counter contact element comprises a hat contact element that is U-shaped and is configured to be pluggable onto the transition surface of the base contact profile, wherein the hat contact element is configured to overlap with the base contact profile in an overlap area.

18. The electrical storage module according to claim 16, wherein the frame devices are configured to be compressible by pressure goggles.

19. The electrical storage module according to claim 16, wherein the counter contact element comprises a counter contact sheet or a counter contact rail.

* * * * *